Patented Feb. 20, 1934

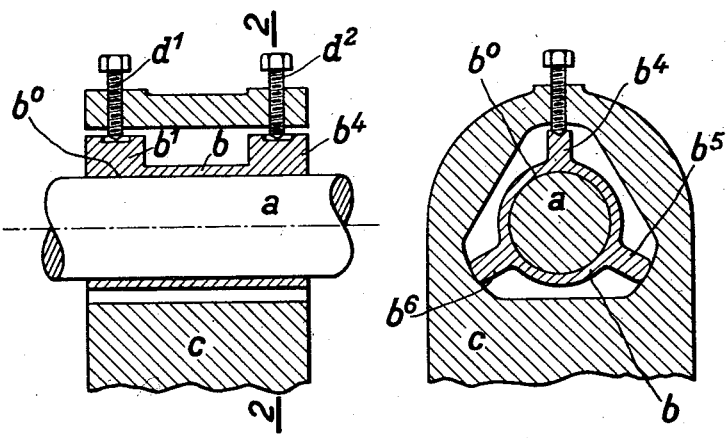
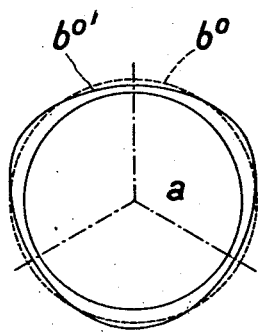
Fig. 1  Fig. 2
Fig. 3
Inventor:
Otto Mackensen

1,947,559

UNITED STATES PATENT OFFICE 1,947,559

BEARING

Otto Mackensen, Jena, Germany

Application March 7, 1930, Serial No. 434,122, and in Germany March 16, 1929

2 Claims. (Cl. 308—240)

The invention pertains to a transverse bearing whose housing carries a solid bushing containing the contact surface for the shaft, and which, when suitably constructed, gives a new solution of the task to furnish wedge-shaped layers of lubricant for the bearing while the shaft is rotating, so as to achieve for the shaft a support as rigid as possible.

The invention attains this aim by providing adjustable members for deforming the bushing relatively to the casing by regulating the clearance between shaft and bushing at least at three and preferably equidistant spots on the circumference of the shaft. Compared with the solutions known so far, the one under consideration has the advantage that the deformation can be regulated at any time during the running of the shaft, so that the bearing is made rigid to an extent which has not been possible hitherto.

When providing intermediate bodies, which are conveniently screwed to or form part of the bushing, between bushing and casing at those spots where the transmission of the deformation powers to the housing takes place, the deformation affords a compensation of pressure which causes the narrow slits arising between bushing and shaft to take a greater length.

In order to be in a position to adjust the direction of the shaft axis relatively to the housing, it is advisable to provide such devices for deforming the bushing relatively to the housing, these devices belonging to two different cross-sections of the shaft. In this case the greatest possible adjusting movement of the shaft is arrived at when an adjusting screw is provided at each of the spots where the transmission of the deformation powers to the housing takes place.

Figures 1 and 2 of the accompanying drawing represent a constructional example of the invention. Figure 1 shows a section through the axis of the shaft which is to be erected in the bearing, and Figure 2 a section perpendicular to this axis. Figure 3 diagrammatically illustrates the effect of the deformation.

The designation $a$ refers to a shaft which is erected with clearance in a solid bushing $b$ with a thin wall. The bushing is disposed in a housing $c$ and has on each end three feet, $b^1$, $b^2$, $b^3$, and $b^4$, $b^5$, $b^6$, respectively, which are displaced 120°. By means of two set-screws, $d^1$ and $d^2$, the bushing $b$ can be pressed against the housing $c$ in such a way that the shaft $a$ is adjusted relatively to the housing $c$, so that the cylindrical contact surface $b^0$ of the bushing takes that form which, for better elucidation, Figure 3 shows strongly distorted in a cross-section $b^{0'}$ whereby the shaft $a$ is assumed to be at rest. In this case narrow slits arise between the shaft $a$ and the contact surface of the bushing $b$, viz at the three spots of the transmission of the deformation powers to the housing, which slits cause the desired rigid support. It must be supposed that, preferably under pressure, a suitable lubricant is still supplied.

I claim:

1. A bearing, the housing of which carries a solid bushing containing the contact surface for the shaft, means for deforming the bushing, these means including a series of projections circumferentially spaced on the bushing, and adjustable means for the adjustment of the clearance between the shaft and the bushing, these means being carried by the said housing and engaging certain of the said projections.

2. A bearing, the housing of which carries a solid bushing containing the contact surface for the shaft, means for deforming the bushing, these means including a series of circumferentially spaced projections at each end of the bushing, and adjustable means for the adjustment of the clearance between the shaft and the bushing, these means being carried by the said housing and engaging certain of the said projections.

OTTO MACKENSEN.